United States Patent
Waldron et al.

(10) Patent No.: US 10,927,889 B2
(45) Date of Patent: Feb. 23, 2021

(54) TURBOCHARGER ROLLER SUPPORT SYSTEM

(71) Applicant: SUPERTURBO TECHNOLOGIES, INC., Loveland, CO (US)

(72) Inventors: Tom Waldron, Loveland, CO (US); Ryan Sherrill, Loveland, CO (US)

(73) Assignee: SUPERTURBO TECHNOLOGIES, INC., Loveland, CO (US)

( * ) Notice: Subject to any disclaimer, the term of this patent is extended or adjusted under 35 U.S.C. 154(b) by 730 days.

(21) Appl. No.: 14/935,526

(22) Filed: Nov. 9, 2015

(65) Prior Publication Data

US 2016/0146047 A1    May 26, 2016

Related U.S. Application Data

(60) Provisional application No. 62/082,515, filed on Nov. 20, 2014.

(51) Int. Cl.
| | | |
|---|---|---|
| *F16C 19/50* | (2006.01) | |
| *F02B 37/00* | (2006.01) | |
| *F04D 29/059* | (2006.01) | |

(52) U.S. Cl.
CPC ............ *F16C 19/507* (2013.01); *F02B 37/00* (2013.01); *F04D 29/059* (2013.01); *F05D 2220/40* (2013.01); *F05D 2240/52* (2013.01); *F05D 2240/54* (2013.01); *F16C 2360/24* (2013.01); *Y02T 10/12* (2013.01)

(58) Field of Classification Search
CPC .... F16C 19/507; F16C 2360/24; F02B 37/00; F04D 17/08; F04D 17/10; F04D 25/02; F04D 25/04; F04D 25/045; F04D 29/04; F04D 29/041; F04D 29/043; F04D 29/046; F04D 29/049; F04D 29/05; F04D 29/051; F04D 29/053; F04D 29/056; F04D 29/059; F05D 2220/40; F05D 2240/52; F05D 2240/54
See application file for complete search history.

(56) References Cited

U.S. PATENT DOCUMENTS

| | | | |
|---|---|---|---|
| 6,406,399 B1 * | 6/2002 | Ai ........................... | F16H 13/06 475/183 |
| 7,490,594 B2 | 2/2009 | Van Dyne et al. | |
| 8,561,403 B2 | 10/2013 | VanDyne et al. | |
| 8,608,609 B2 | 12/2013 | Sherrill et al. | |
| 8,668,614 B2 | 3/2014 | Sherrill et al. | |
| 8,677,751 B2 | 3/2014 | VanDyne et al. | |
| 8,820,056 B2 | 9/2014 | VanDyne et al. | |
| 9,217,363 B2 | 12/2015 | Riley et al. | |

(Continued)

*Primary Examiner* — Kenneth Bomberg
*Assistant Examiner* — Adam W Brown
(74) *Attorney, Agent, or Firm* — Cochran Freund & Young LLC; William W. Cochran

(57) ABSTRACT

Disclosed is an embodiment of a turbocharger roller support system that utilizes roller-shaft interfaces that are slanted to locate a turbocharger shaft with a turbine and compressor. Slanted contact surfaces on the turbocharger shaft are slanted inwardly so that the turbo shaft remains centered in the roller support system. The rollers entirely locate the turbocharger shaft, so that no bearings are necessary directly on the turbocharger shaft. The rollers spin at a slower speed than the turbocharger shaft, so can utilize lower speed bearings.

5 Claims, 3 Drawing Sheets

(56) References Cited

U.S. PATENT DOCUMENTS

| | | | |
|---|---|---|---|
| 9,581,078 B2 | 2/2017 | Brinks et al. | |
| 9,670,832 B2 | 6/2017 | Sherrill et al. | |
| 2011/0036089 A1* | 2/2011 | Triller | F02B 37/10 |
| | | | 60/608 |
| 2013/0017920 A1* | 1/2013 | Sherrill | F16H 13/10 |
| | | | 475/183 |
| 2016/0123223 A1 | 5/2016 | Brown | |
| 2016/0146096 A1 | 5/2016 | Sherrill et al. | |

* cited by examiner

TURBOCHARGER ROLLER SUPPORT SYSTEM

BACKGROUND

Turbochargers are commonly used for a variety of internal combustion engines to increase air flow to the engine. Conventional turbochargers are driven by waste exhaust heat and gases, which are forced through an exhaust turbine housing onto a turbine wheel. The turbine wheel is connected by a common turbo-shaft to a compressor wheel. As the exhaust gases hit the turbine wheel, both wheels simultaneously rotate. Rotation of the compressor wheel draws air in through a compressor housing, which forces compressed air into the engine cylinders to achieve improved engine performance and fuel efficiency. Turbochargers for variable speed/load applications are typically sized for maximum efficiency at torque peak speed in order to develop sufficient boost to reach peak torque.

SUMMARY

An embodiment of the invention may therefore comprise a roller support system for a turbocharger comprising a free-spinning turbo shaft, a turbine connected to the turbo shaft, a compressor connected to the turbo shaft, a first slanted contact surface formed on the turbo shaft, the first slanted contact surface slanted at a first angle in a first direction, a second slanted contact surface formed on the turbo shaft, the second slanted contact surface slanted at a second angle, the second angle being substantially equal to and in an opposite direction of the first angle, and at least three rollers, each of the at least three rollers comprising a first roller outer surface that engages the first slanted contact surface of the turbo shaft to form a first plurality of roller-shaft interfaces, and a second roller outer surface that engages the second slanted contact surface of the turbo shaft to form a second plurality of roller-shaft interfaces, wherein the first plurality of roller-shaft interfaces and the second plurality of roller-shaft interfaces locate the turbo shaft axially and radially and counteract axial forces on the turbo shaft.

An embodiment of the invention may further comprise a method of providing support to a turbo shaft in a turbocharger, the method comprising locating the turbo shaft by positioning at least three rollers in contact with contact surfaces on the turbo shaft.

DETAILED DESCRIPTION OF THE EMBODIMENTS

An embodiment of the invention comprises a turbo shaft support system utilizing rollers that interface with the turbo shaft. The rollers generally comprise a roller outer surface and a bearing. The roller outer surface prevents the bearing from being located directly on, or next to, the turbo shaft and thereby lessens the rotational speed of the bearing to mitigate any damage or degradation of the roller and bearing. As is understood by those skilled in the art, the bearings can be fluid bearings, or any other specialized high-speed ball bearings.

Figure 1:
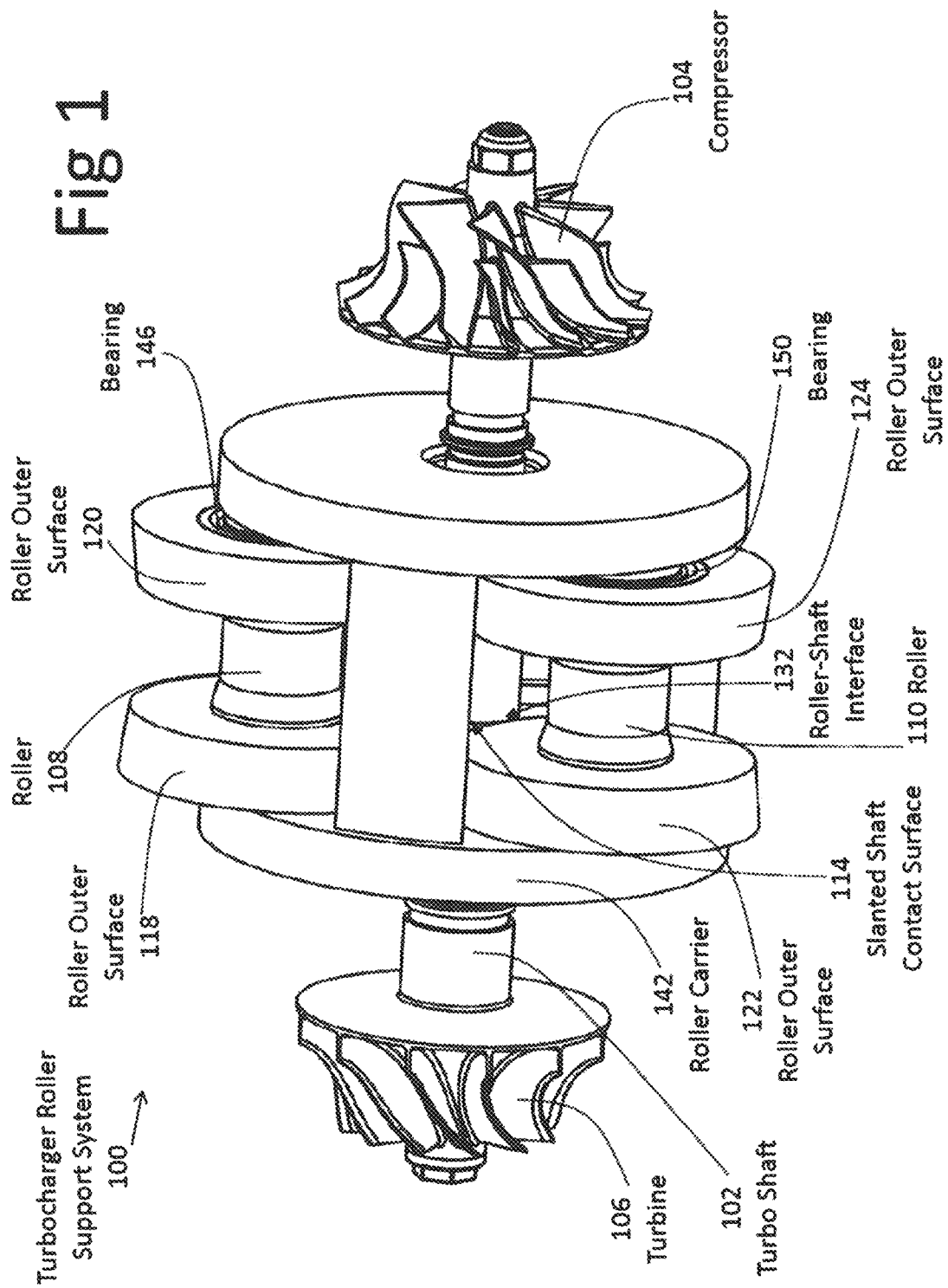
FIG. 1 is a schematic isometric view of an embodiment of a turbocharger roller support system.

FIG. 1 is a schematic isometric view of an embodiment of a turbocharger roller support system 100. The turbocharger roller system 100 comprises a turbo shaft 102 and a plurality of rollers 108, 110. The system 100 of FIG. 1 has two visible rollers. In the embodiment shown in FIG. 1, a third roller is situated behind the system to provide a triangular support system with an associated three points of support contact with the turbo shaft 102.

Figure 3:
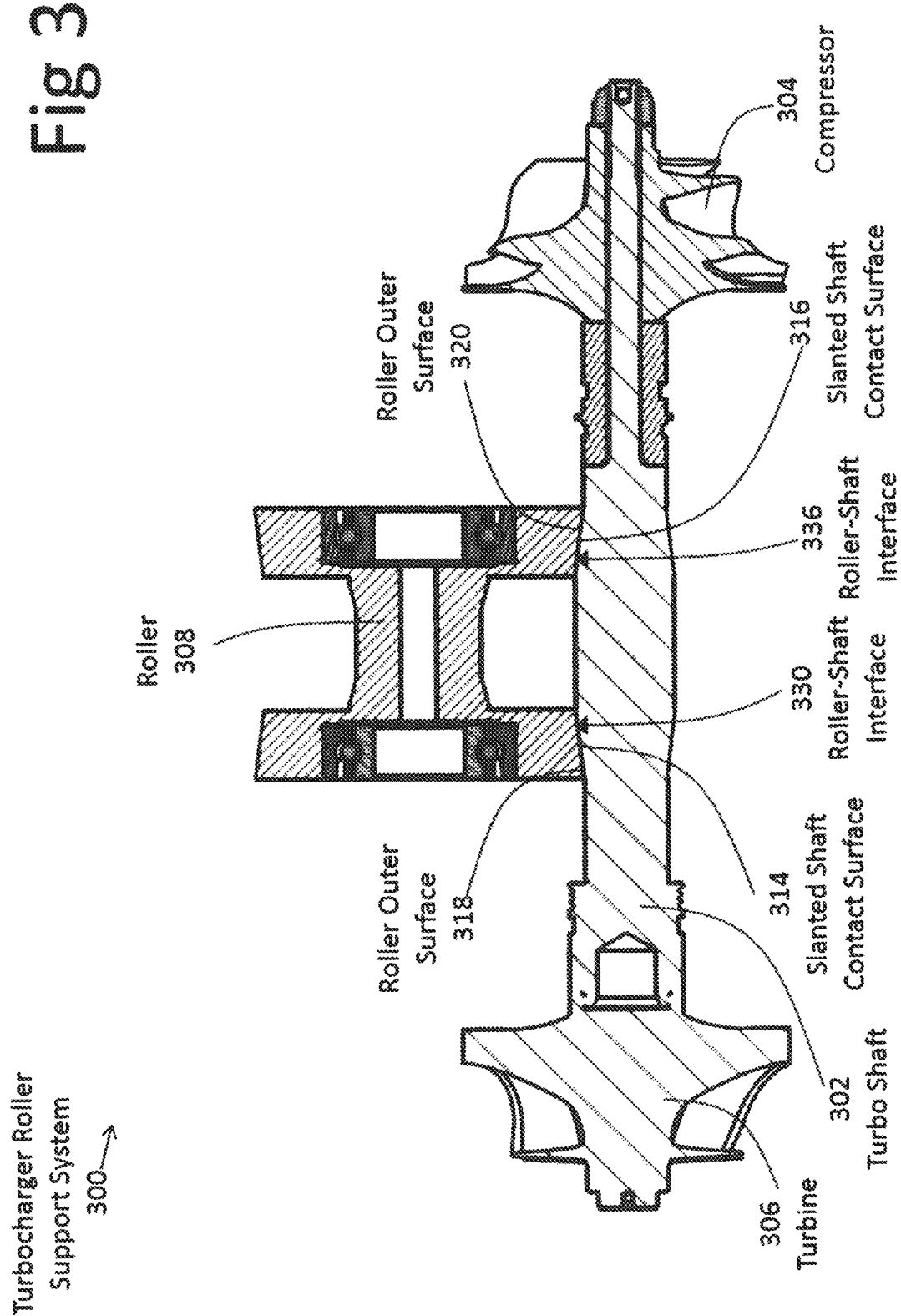
FIG. 3 is a schematic cross-sectional view of a turbo shaft and a support roller.

Turbo shaft 102 has a compressor 104 and a turbine 106 attached at opposite ends. The central part of turbo shaft 102 has slanted shaft contact surfaces 114 that are slanted in substantially equal but opposite directions. Only one of the slanted shaft contact surfaces is shown in FIG. 1. FIG. 3 shows a turbo shaft with slanted contact surfaces and associated roller. Continuing with FIG. 1, roller 110 has a roller outer surface 122 that mates with slanted shaft contact surface 114 to form roller-shaft interface 132. Roller 108 has a like roller outer surface 118 and forms a like roller-shaft interface. The rollers 108, 110 also have roller outer surfaces 120, 124 that mate with a second slanted shaft contact surface (not visible) to form additional roller-shaft interfaces. Similarly to the slanted shaft contact surfaces, only one of the roller-shaft interfaces is shown in FIG. 1. Turbo shaft 102 is held in place by the rollers 108, 110 through roller-shaft interfaces 132 both radially and axially. Rollers 108, 110, will absorb thrust forces on turbo shaft 102 from compressor 104 and turbine 106 as taught in U.S. Patent Application Ser. No. 61/906,938, filed Nov. 21, 2013, entitled "Thrust Absorbing Planetary Traction Drive Superturbo," which has been specifically incorporated herein by reference for all that it discloses and teaches.

Figure 2:
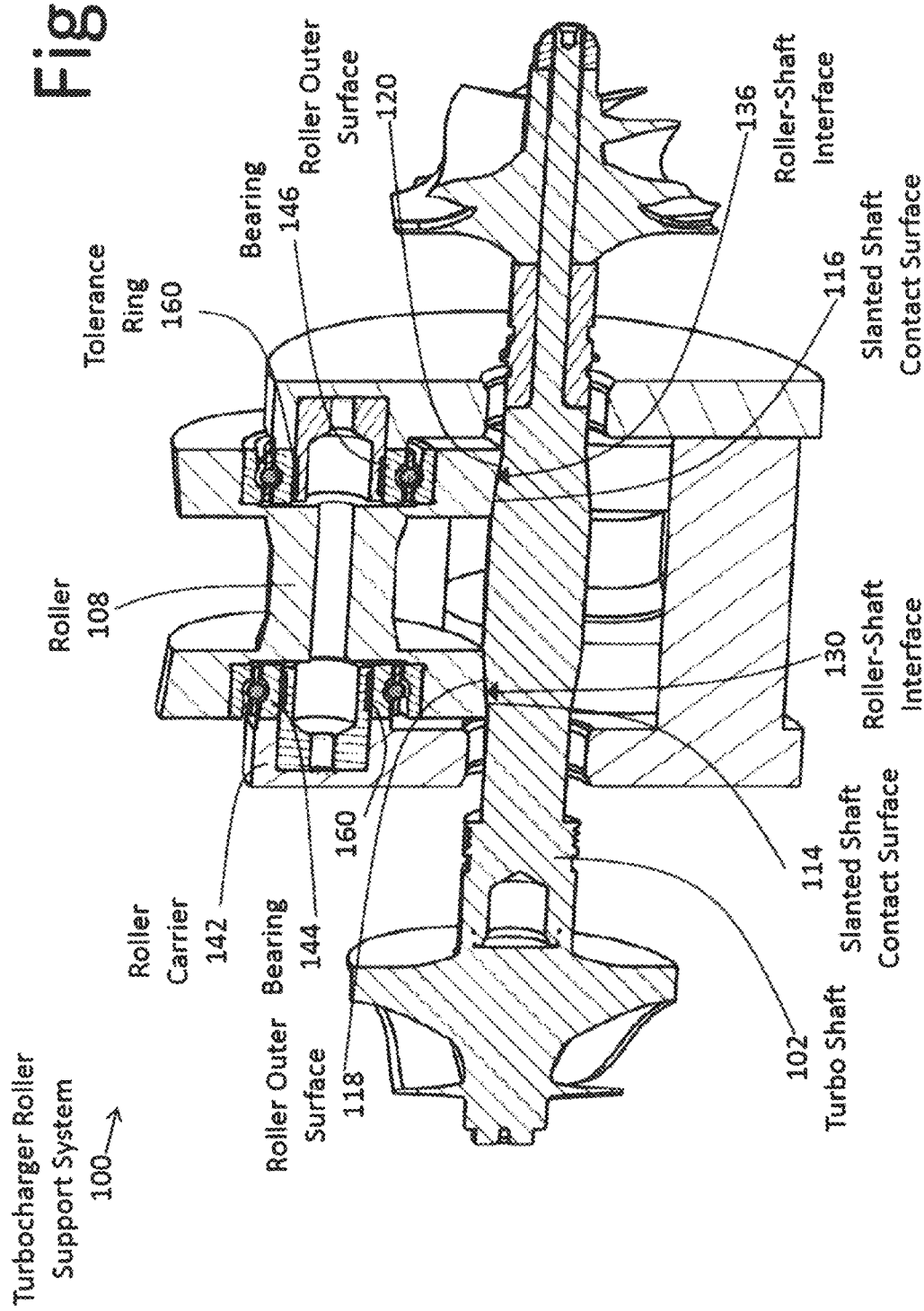
FIG. 2 is a schematic cross-sectional view of the embodiment of a turbocharger roller support system.

Rollers 108, 110 are supported by roller carrier 142. Roller 108 is supported through bearing 146 and another bearing that is not shown in FIG. 1. Roller 110 is supported through bearing 150 and another bearing that is not shown in FIG. 1. It is understood that the reciprocal sides of the rollers 108, 110 have like bearings. Also, the third roller of the embodiment shown in FIG. 1, as discussed above, has like bearings on both sides. Rollers 108, 110 are pressed against turbo shaft 102 with sufficient force to hold turbo shaft 102 in place and prevent excessive movement of turbo shaft 102 other than rotation about its axis. The rollers 108, 110 are not connected to any type of gearing or transfer wheel so do not transfer torque from, or to, the turbo shaft 102. Additionally, flexible mounts such as tolerance rings (the tolerance rings 160 are shown in FIG. 2) can be used between bearings 146, 150 and roller carrier 142 to provide damping to the system and reduce vibration. Tolerance rings are used inside a bore for bearing mounts. Tolerance rings are generally self-retaining, and may be designed to fit inside a nominal circumference. Tolerance rings 160 provide flexible mounting of the rollers 108, 110 as taught in U.S. Pat. No. 8,668,614, issued Mar. 11, 2014, entitled "HIGH TORQUE TRACTION DRIVE," which has been specifically incorporated herein by reference for all that it discloses and teaches. Tolerance rings 160 are mounted on the recessed portions of bearing (See FIG. 2 where the bearings are referenced as 144, 146). Roller outer surfaces 118, 120, 122, 124 are made with a larger diameter than slanted shaft contact surfaces 114 so that rollers 108, 110 rotate at a lower speed than turbo shaft 102. This speed reduction allows bearings 146, 150 to rotate at a lower speed than bearings located directly on the turbo shaft 102. This reduces the design requirements of bearings 144, 150 and more traditional, lower speed bearings can be utilized.

Tolerance rings 160 provide flexible mounting of the roller 108. The tolerance ring 160 prevents overloading of bearings 144, 146. The tolerance rings 160 are mounted inside of bearings 144, 146. The tolerance rings 160 may absorb vibrational impacts in any sort of out-of-balance or vibrational effects created by roller 108. The tolerance rings 160 are radial springs that are capable of elastic movement in a radial direction. The tolerance rings 160 are capable of compressing, which allows the roller 108 to absorb vibration and maintain contact with the turbo shaft 102. The tolerance rings 160 may be manufactured of any suitable material that allows for elastic movement. In an embodiment of the invention, the tolerance rings 160 may be constructed from a spring type of steel that has a wavy type configuration that is formed into a ring. The wavy configuration allows the tolerance rings 160 to be compressed with a certain amount of force depending upon the thickness and elasticity of the spring steel used in the tolerance rings 160. Since the tolerance rings 160 have a wavy configuration, the tolerance rings 160 can be deflected in a radial direction. It is understood that each roller in an embodiment of the invention, such as roller 108, roller 110 in FIG. 1, for example, and a third, or more, roller (as discussed in this specification) have an associated bearing and tolerance ring.

The turbo shaft 102 rotates due to the exhaust gases hitting the turbine 106. The turbo shaft 102 is a free-spinning shaft. As such, there is not torque transfer, as noted above, from the turbo shaft to the rollers 108, 110. This is because the rollers 108, 110 do not engage any other mechanisms (besides the roller carrier 142 which merely holds the rollers 108, 110 in place and allows for free spinning of the rollers 108, 110) such as a drive ring.

The rollers 108, 110 are comprised of any suitable material that allows contact throughout rotation with the turboshaft 102. Also, the rollers 108, 110 are constructed of any suitable material that will withstand the range of rotation speeds of turbochargers. It is understood that in the embodiments of the invention, as discussed below, differing ratios between the diameter of the turbo shaft at the contact surfaces 114 and that of the roller outer surfaces 120, 124 allows for a slower rotation of the rollers 108, 110.

FIG. 2 is a cross-sectional view of the embodiment of the turbocharger roller support system 100 of FIG. 1. Roller 108 is supported in roller carrier 142 by bearings 144, 146. Roller 108 has roller outer surfaces 118, 120 that mate with slanted shaft contact surfaces 114, 116 to form roller-shaft interfaces 130, 136. Roller-shaft interfaces 130, 136, along with the other roller-shaft interfaces shown and discussed in connection to FIG. 1, locate turbo shaft 102 and prevent movement of turbo shaft 102 other than rotation about its axis. Additionally, tolerance rings 160 can be utilized between bearings 144, 146, and roller carrier 142 to provide flexibility in assembly as well as damping of vibrations in the turbocharger roller support system 100. Tolerance rings 160 can alternately be located between bearings 144, 146 and roller 108. The diameter of roller outer surfaces 118, 120 is larger than the diameter of slanted shaft contact surfaces 114, 116, so that roller 108 spins at a lower speed than turbo shaft 102. For example, if roller outer surfaces 118, 120 have a diameter of 4 times that of slanted shaft contact surfaces 114, 116, then roller 108 will spin at a speed of ¼ that of turbo shaft 102. If the maximum rotational speed of turbo shaft 102 is 160,000 RPM, then the maximum rotational speed of roller 108 is 40,000 RPM, and bearings 144, 146 can be designed for a maximum rotation speed of 40,000 RPM vs. 160,000 RPM if they were located directly on turbo shaft 102. This reduces the design requirements for bearings 144, 146.

The embodiments shown in FIGS. 1 and 2 show three roller units evenly spaced around, and in contact with, the turbo shaft. A minimum of three roller units are necessary to provide even support to the turbo shaft. Further, the roller units should be substantially evenly spaced to provide even support around the turbo shaft. An exact 120 degrees of separation may not be required. Slight differences in the angles of separation of the rollers may be allowable to enable placement of the roller units with other engine elements. However, the limits to how far the roller units can vary from an even placement around the turbo shaft may be determined by experimentation on a particular turbo shaft embodiment. Accordingly, the number of rollers may be more than three (3). There may be four (4), five (5) or more rollers that are used to provide additional support to the turbo shaft. Substantially evenly spaced rollers in contact with a turbo shaft will act to counteract thrust forces generated in an axial direction on the turbo shaft and prevent movement of the turbo shaft other than rotation about the turbo shaft's axis.

FIG. 3 is a schematic cross-sectional view of a turbo shaft and a support roller. A turbo shaft 302 has a turbine 306 connected to one end and a compressor 304 connected to the other end. The turbo shaft 302 has slanted shaft contact surfaces 314, 316. The roller 308 has roller outer surfaces 318, 320 that mate with the slanted shaft contact surfaces 314, 316 to form roller-shaft interfaces 330, 336. These roller-shaft interfaces 330, 336 locate turbo shaft 302 both axially and radially, and counteract thrust forces from turbine 306 and compressor 304.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:
1. A turbocharger having a roller support system, the turbocharger comprising:
  a free-spinning turbo shaft;
  a turbine connected to said free-spinning turbo shaft;
  a compressor connected to said free-spinning turbo shaft;
  said roller support system comprising:
    at least three rollers that support said free-spinning turbo shaft without bearings on said free-spinning turbo shaft and without creating traction interfaces between said at least three rollers and said free-spinning turbo shaft;
    a roller carrier that holds said at least three rollers in place in an axial direction:
    a first slanted contact surface formed on said free-spinning turbo shaft, said first slanted contact surface slanted at a first angle in a first direction;
    a second slanted contact surface formed on said turbo shaft, said second slanted contact surface slanted at a second angle, said second angle being in an opposite direction of said first angle;

wherein each of said at least three rollers comprise a first roller outer surface that engages said first slanted contact surface of said free spinning turbo shaft to form a first plurality of roller-shaft interfaces, and a second roller outer surface that engages said second slanted contact surface of said free-spinning turbo shaft to form a second plurality of roller-shaft interfaces, wherein said first plurality of roller-shaft interfaces and said second plurality of roller-shaft interfaces locate said free-spinning turbo shaft axially and radially and counteract axial forces on said free-spinning turbo shaft to maintain positioning of said free-spinning turbo shaft when said free-spinning turbo shaft is spinning.

2. The turbocharger having a roller support system of claim 1, wherein each of said at least three rollers further comprises at least one tolerance ring.

3. The turbocharger having a roller support system of claim 1 wherein said at least three rollers comprise at least three double rollers.

4. A method of providing support to a free-spinning turbo shaft in a turbocharger, said method comprising:

using a roller carrier to hold at least three sets of rollers in place in an axial direction of said free-spinning turbo shaft;

locating and positioning said free-spinning turbo shaft axially and radially by placing said at least three rollers, having slanted contact surfaces, in contact with slanted contact surfaces on said free-spinning turbo shaft;

causing said free-spinning turbo shaft to be supported in a radial direction of said turbo shaft by exerting radial forces on said turbo shaft created by said at least three rollers to maintain positioning of said free-spinning turbo shaft in said radial direction without bearings on said free-spinning turbo shaft and without creating traction interfaces between said at least three rollers and said free-spinning turbo shaft;

causing said free-spinning turbo shaft to be supported in an axial direction by said slanted contact surfaces of said at least three rollers that engage said slanted contact surfaces of said turbo shaft to maintain positioning of said free-spinning turbo shaft in an axial direction which creates axial forces on said slanted contact surfaces of said free-spinning turbo shaft that support said free-spinning turbo shaft in said axial direction of said free-spinning turbo shaft as a result of engagement of said slanted contact surfaces of said free-spinning turbo shaft with said slanted contact surfaces of said at least three rollers without bearings on said free-spinning turbo shaft.

5. The method of claim 4, wherein said contact surfaces on said free-spinning turbo shaft comprise a first slanted contact surface and a second slanted contact surface that have equal angles to said axial direction of said free-spinning turbo shaft and are angled in opposite directions.

* * * * *